United States Patent [19]

Steudel

[11] 4,156,253

[45] May 22, 1979

[54] SOUND-IN-VIDEO TELEVISION TRANSMISSION

[75] Inventor: Günter Steudel, Stuttgart, Fed. Rep. of Germany

[73] Assignee: International Standard Electric Corporation, New York, N.Y.

[21] Appl. No.: 875,260

[22] Filed: Feb. 3, 1978

[30] Foreign Application Priority Data

Feb. 9, 1977 [DE] Fed. Rep. of Germany ....... 2705342

[51] Int. Cl.² .......................................... H04N 9/00
[52] U.S. Cl. .................................... 358/11; 358/12; 358/145
[58] Field of Search ................... 358/12, 13, 143, 144, 358/145, 147

[56] References Cited

FOREIGN PATENT DOCUMENTS

2529728  1/1977  Fed. Rep. of Germany ........... 358/145

OTHER PUBLICATIONS

Maegele, Journal of the S.M.P.T.E. vol. 84, Feb. 1975, pp. 68–70.

Primary Examiner—Robert L. Richardson
Attorney, Agent, or Firm—John T. O'Halloran; Peter C. Van Der Sluys

[57] ABSTRACT

A sound-in-video signal transmission system is made compatible with present domestic TV receivers by transmitting the color-sync signal in the time domain according to the current standard, and the sound signals are transmitted partly before it and partly after it.

10 Claims, 6 Drawing Figures

SOUND-IN-VIDEO TELEVISION TRANSMISSION

BACKGROUND OF THE INVENTION

1. Field of the Invention

The present invention relates to a color television transmission system wherein a color-sync signal and digital sound signals from at least one sound channel are transmitted in the horizontal blanking intervals during the period of the back porch, with the color-sync signal and the digital sound signals separated from each other.

2. Description of the Prior Art

A color television transmission system of the type to which this invention relates is shown in German Published Patent Application (DT-OS) No. 2,350,477.

It comprises transmitting and receiving equipment and, if necessary, relay stations of television links where for reasons of frequency economy, no sound channels are provided for the sound signals. The sound signals are "integrated in the video signal," so to speak. Such links may be terrestrial radio links, e.g., for transmitting television signals from the studio to the transmitter, or links including a satellite, or cable links, e.g., in cable television networks.

In any case, these links end at a transmitter which supplies the domestic receivers via separate video and sound channels.

To extend this system beyond the transmitter up to the domestic receivers, it was proposed in the application No. P 25 29 728.3 for a patent of addition to provide the present domestic receivers, during the transition period until the introduction of new domestic receivers capable of processing the composite video-sound signal, with added facilities which convert the received video-sound signal to the standard form, extract the sound signals, and feed the video and sound signals so obtained to the domestic receiver separately. This is an expensive solution, however.

On the other hand, it has been proposed ("Funkschau" 1974, No. 11, p. 398 bottom right) to transmit during the transition period, in addition to the composite video-sound signal, the sound signals from the transmitter to the domestic receivers on a separate sound channel as in the past.

It is a prerequisite therefore that the domestic receivers presently in use be capable of receiving at least the video signals of the composite video-sound signal correctly. With the signals transmitted in the known system, this is impossible.

SUMMARY OF THE INVENTION

Accordingly, the object of the invention is to provide a color television transmission system of the kind referred to by way of introduction, comprising transmitting equipment which delivers video-sound signals composed in such a way that the domestic receivers presently in use can receive the video signal correctly, and receiving equipment which processes these composite video-sound signals.

This object is achieved by a television transmission system wherein a color-sync signal and digital sound signals from at least one sound channel are transmitted in the horizontal blanking intervals during the period of the back porch, with the color-sync signal and the digital sound signals separated from each other, characterized in that the transmitting facility transmits part of the sound signals to be transmitted during a line period before the color-sync signal and the remainder thereafter, and that receiving facilities are provided which take their sound signals from the video-sound signal so composed.

DESCRIPTION OF THE INVENTION

Figure 1:
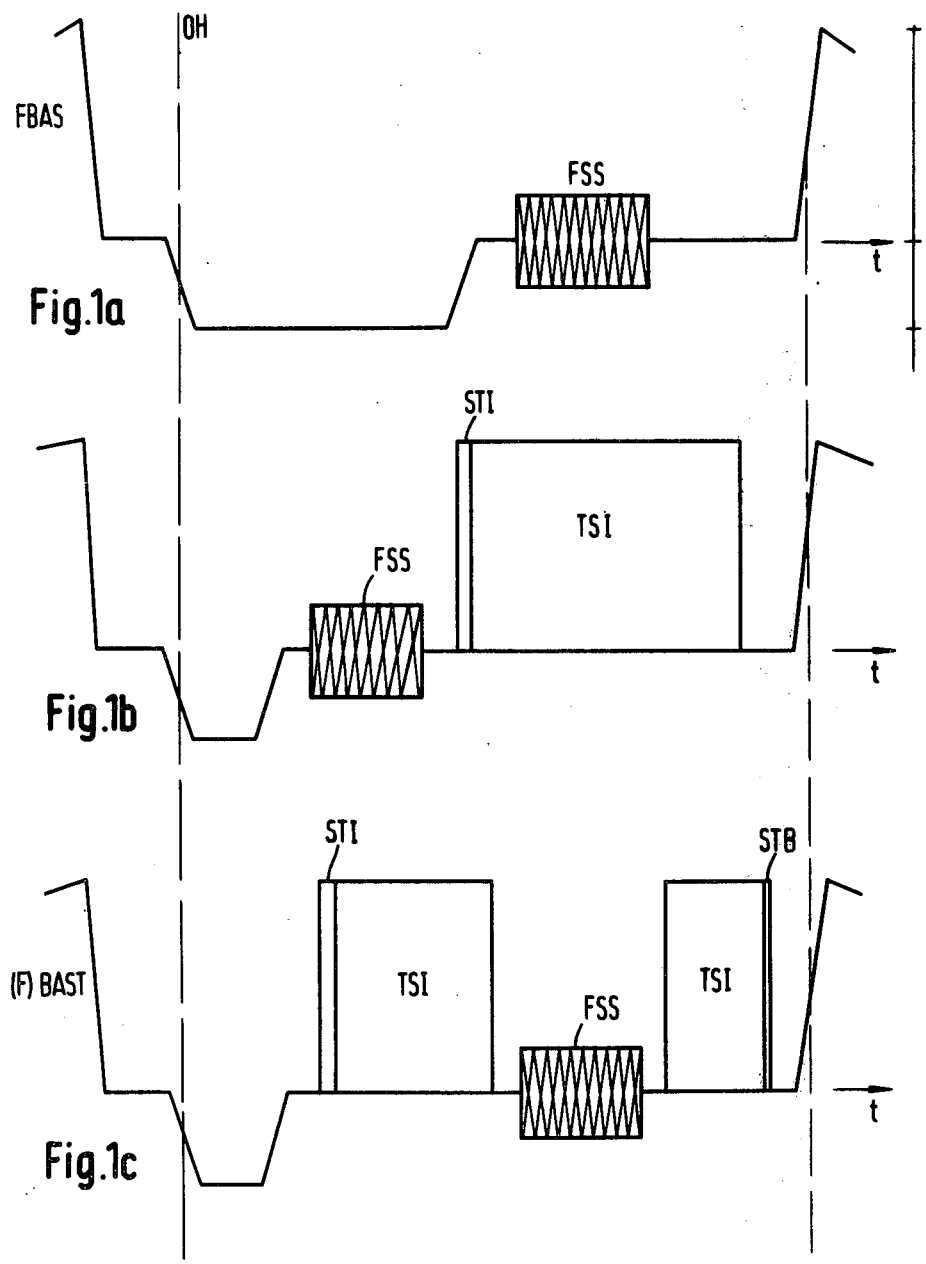
FIG. 1a shows the horizontal blanking interval according to the present standard "B/G PAL."
FIG. 1b shows the horizontal blanking interval with sound signals according to the known television transmission system.
FIG. 1c shows the horizontal blanking interval with sound signals according to the television transmission system according to the invention.

FIG. 1a shows the horizontal blanking interval according to the standard "B/G-PAL" (625 lines) (CCIR Report 624, "Characteristics of Television Systems," System B/G, CCIR Green Book, Vol. 11 (1974), XIIIth Plenary Assembly).

The horizontal sync pulse, which begins with a negative edge, the OH edge, is followed by the back porch, during which the color-sync signal FSS is transmitted.

In the known television transmission system, shown in FIG. 1b, the horizontal sync pulse has been shortened to lengthen the duration of the back porch. The color-sync signal (FSS) has also been shortened and shifted from its standard position to the front end of the extended back porch, whereby there is space on the latter for the transmission of digital sound signals (TSI) from at least one sound channel. Immediately before the sound signals TSI, a start pulse STI is transmitted.

If a bandwidth of 15 kHz per sound channel is required, two sound channels can be transmitted. In the case of the 625-line standard, the sound signals are advantageously sampled at twice the line frequency 2 fH, i.e., at $2 \times 15.625$ kHz$=31.25$ kHz, for example. The pulse repetition frequency of the PCM sound signals is twice the frequency $2f_{sc}$ of the color burst, which is present in all color television systems. As mentioned above, this composite video signal is not compatible with the domestic receivers presently in use.

In contrast, the composite video signal of the television transmission system according to the invention, whose horizontal blanking interval is shown in FIG. 1c, is compatible with present-day domestic receivers. Investigations have shown that a horizontal sync pulse shortened as compared to the standard can still be processed correctly. In this system, the color-sync signal FSS is shorter than in the standard system but is transmitted in the standard time slot. Part of the digital sound signals are transmitted before the color-sync signal, and the remainder thereafter. The sound signal TSI is preceded by a start pulse STI, and at its end an additional bit STB for controlling the receiving equipment is transmitted which has a particular meaning according to the line referred to the beginning of the picture.

A present-day domestic receiver cannot utilize the sound signals and the control bits STB, of course, but with the sync signals, i.e., the horizontal sync pulse and the color-sync signal FSS, correct line and chrominance-subcarrier synchronization is made possible.

Figure 2:
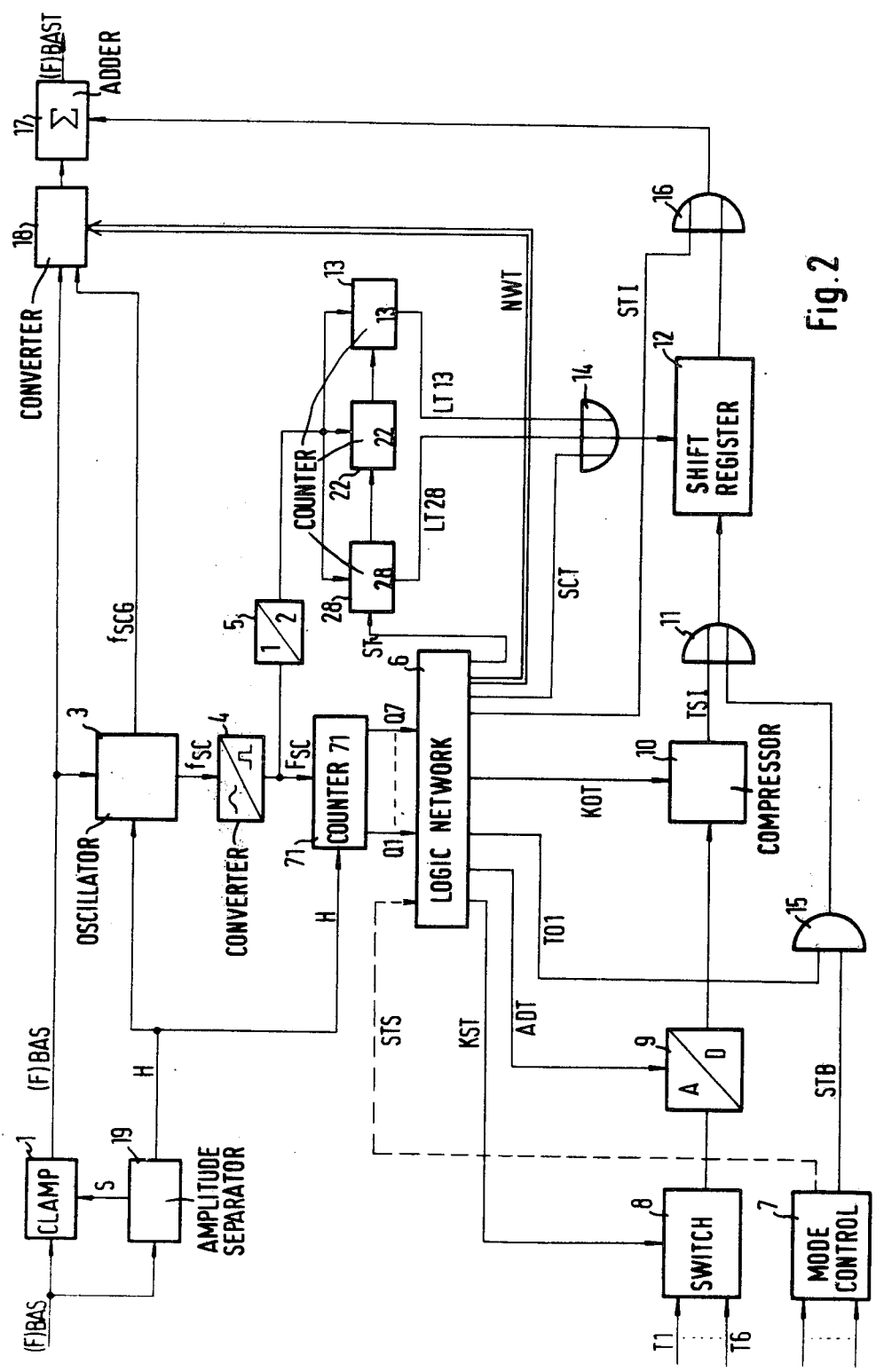
FIG. 2 shows a schematic diagram of the transmitting end of the system according to the invention.

A facility at the transmitting end for conditioning the video-sound signal FBAST composed as illustrated in FIG. 1c is shown in FIG. 2. This facility is located, for example, in the studio of a television transmission system as explained below with the aid of FIG. 4.

It is assumed that the upper input of the facility of FIG. 2 is fed with a PAL-coded color-television signal including a color-sync signal and a standard horizontal blanking interval as shown in FIG. 1a. In a monochrome signal there is no color-sync signal FSS in the horizontal blanking interval. The input signal (F)BAS (F=color, BAS=video signal) is fed to a clamping circuit 1 and, at the same time, to an amplitude separator 19 which separates the sync pulses S from the composite video signal (F) BAS and feeds them as clamping pulses to the clamping circuit 1 which clamps its input signal to the sync level shown in FIG. 1a. In addition, the amplitude separator 19 derives from the horizontal sync pulses, pulses H of line frequency $f_h$. If the input signal is a composite color signal (FBAS signal), a chrominance-subcarrier oscillator 3 uses the color-sync signal FSS, FIG. 1a, contained in the composite color signal to generate a chrominance subcarrier $f_{sc}$ which has the frequency of the color-sync signal but a fixed phase. In addition, the chrominance-subcarrier oscillator provides, via a phase switch not shown, a chrominance subcarrier $f_{scg}$ whose phase, like the phase of the color-sync signal, is changed from line to line by 90° according to the PAL standard. The chrominance subcarrier $f_{sc}$ not changed in phase is fed from the chrominance subcarrier oscillator 3 to a sine-square wave converter 4 whose square-wave output signal $F_{sc}$ with the chrominance-subcarrier frequency is applied as a clock signal to a counter 71 and, via a frequency doubler 5, to additional counters 28, 22 and 13.

The counter 71 is set to 0 on each OH edge of the pulses H of horizontal frequency, generated in the amplitude separator, and then counts 71 square-wave pulses $F_{sc}$. Since in the case of the 625-line standard the chrominance-subcarrier frequency $f_{sc}$ is about 284 times that of the horizontal frequency $f_H$, the counter has a count time of one quarter of a line period. The count time covers the horizontal blanking interval, so the count of the counter 71 is suited to dividing this interval in time.

Via 7 outputs Q1 . . . Q7, the counts of the counter 71 are fed in binary-coded form to a logic network 6. This logic network contains basic logic circuits and generates the clock signals necessary for sound processing and having the desired length and time position.

As far as the sound signals to be integrated into the video signal are concerned, three modes of operation are provided. It is possible to transmit either two high-quality sound channels of 15 kHz bandwidths each, or one high-quality sound channel of 15 kHz bandwidth and three commentary sound channels of 5 kHz bandwidth each, or 6 commentary sound channels of 5 kHz bandwidth each. Thus it is possible to transmit a television program with associated sound in different languages or with stereo sound in a bandwidth-saving manner.

The information on the desired mode and on the presence of a monochrome or a color-picture signal is now entered into a mode control 7 in a manner not shown in detail. Dependent upon its input information, the mode control provides the aforementioned control bits STB to be integrated into the video signal, and a control signal STS to the logic network, which determines therefrom the clock signal KST for a sound channel switch 8 which sequentially switches the maximum of 6 sound channels T1 . . . T6, connected to its input, to an analog-to-digital converter 9.

This analog-to-digital converter 9 encodes each sample value of the previously band-limited sound signals into a 14-bit word which is subsequently reduced to 10 bits in a compressor 10. The necessary clock signal ADT for the analog-to-digital converter and the clock signal KOT for the compressor are provided by the logic network 6. If two 15-kHz bandwidth high-quality sound channels have to be transmitted, each of them is sampled at twice the horizontal frequency, so that 2·2·10=40 bits per line appear successively at the compressor output, which are fed to the input of a shift register 12 through an OR gate 11. A write signal SCT generated in the logic network 6 and applied through an OR gate 14 to the clock input of the shift register 12 serves to write the control bit and the sample values obtained during a line period. Following the bits of the sound signal TSI, the control bit STB, which comes from the mode control 7 and passes through an AND gate 15 and the OR gate 11, is written as the 41st bit into the shift register 12. To accomplish this, a gating pulse T01 causes the AND gate 15 to pass the control bit STB, which is written into the shift register 12 with a write pulse SCT appearing during the "open" period of the gate. At a suitable predetermined time, the logic network 6 provides the start pulse STI to be placed ahead of the sound signals TSI shown in FIG. 1c. This start pulse passes through an OR gate 16 and is applied to one input of an adding stage 17. Immediately thereafter, a start pulse ST, which also comes from the logic nerwork 6, starts the counter 28, which then counts to 28, applying 28 read pulses LT28 to the clock input of the shift register 12 through the OR gate 14. Thus, the first part of the sound signals TSI shown in FIG. 1c is read out and integrated into the composite video signal after the start pulse STI. On its way to the adding stage 17, where the sound signals are added, the composite video signal (F)BAS coming from the clamping circuit 1 passes through a standards converter 18 which, controlled by clock signals NWT from the logic network, shortens the horizontal sync pulse and adds to the video signal, in the standard time slot, a shortened, phase-switched color-sync signal FSS shown in FIG. 1c from the phase-switched chrominance-subcarrier wave $f_{scg}$ generated by the chrominance-subcarrier oscillator 3. In order that no sound signals are fed to the adding stage during the time intended for the color-sync signal FSS, the counter 28, upon reaching its final count 28, starts a counter 22, which counts 22 clock pulses of twice the chrominance-subcarrier frequency. This counter 22 provides no read pulses but, upon reaching its final count 22, starts a counter 13 which applies 13 read pulses LT13 to the clock input of the shift register 12, thus reading the second part of the sound signals and the control bit STB, a total of 13 bits. The adding stage 17 now delivers the composite video-sound signal (F)BAST with a horizontal blanking interval as shown in FIG. 1c (T=sound). Following conversion to radio frequency, this video-sound signal is transmitted.

Figure 3:
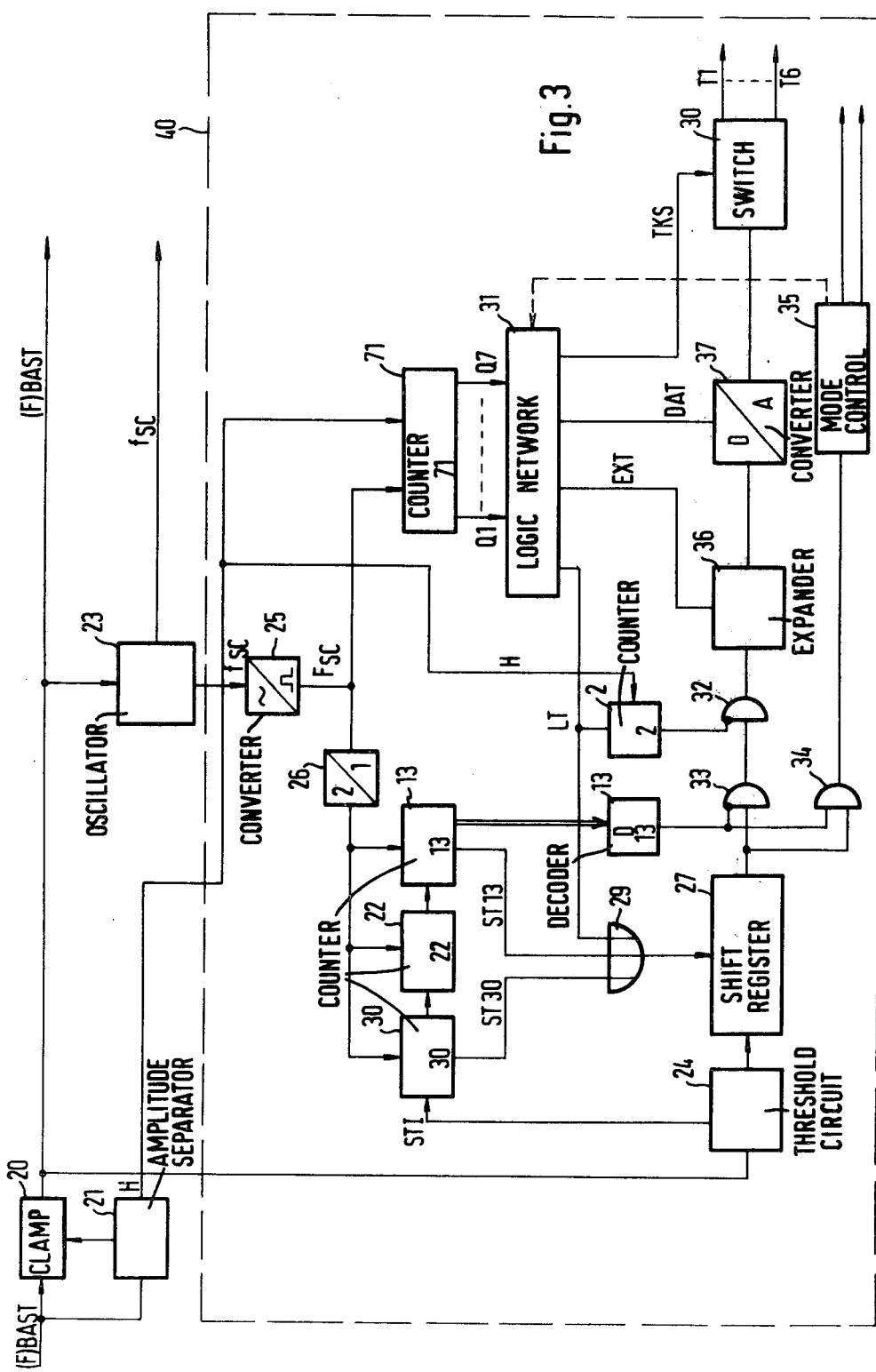
FIG. 3 shows a schematic diagram of the receiving end of the system according to the invention.

It should be mentioned that a so-called color-sync signal FSS with a phase alternating from line to line by 90° is also transmitted with a monochrome video signal (BAS). At the receiving end, this color-sync signal serves exclusively to decode the digital sound signals transmitted at twice the chrominance-subcarrier frequency. In this case, the chrominance-subcarrier generator 3 runs free since the standard monochrome signal contains no color-sync signal. The phase switch is controlled by the H-pulses of horizontal frequency provided by the amplitude separator 2. The facility at the receiving end of the television transmission system is shown in FIG. 3.

This facility consists of a portion already contained in present-day color-television receivers, namely the clamping circuit 20, the amplitude separator 21, and the chrominance-subcarrier oscillator 23, and of an additional portion 40 which is bordered by a broken line. This portion serves to process the sound signals integrated in the video signal.

The composite video-sound signal (F)BAST is received in the audio band and applied to the clamping circuit 20 and the amplitude separator 21, which operate like the corresponding devices at the transmitting end and need not, therefore, be explained again. The color-sync signal FSS contained in the (F) BAST-signal synchronizes the receiver's chrominance-subcarrier oscillator 23, which provides the chrominance subcarrier $f_{sc}$ of fixed phase. The clamped (F)BAST-signal and the chrominance subcarrier $f_{sc}$ are processed in known manner by devices not shown.

To process the sound signals, the clamped signal (F)BAST is fed to a threshold circuit 24 which detects the start pulse STI and then immediately starts a counter 30. This counter 30 as well as the counters 22 and 13 are fed with a clock signal derived from the chrominance subcarrier $f_{sc}$ by converting the latter to a square-wave signal in a sine-square wave converter 25 and doubling its frequency in a frequency doubler 26. The counter 30 applies 30 write pulses ST30 through an OR gate 29 to the clock input of a shift register 27, thus causing the 30 bits received prior to the color-sync signal FSS shown in FIG. 1c to be written into this shift register. These 30 bits consist of 2 bits for the start pulse and 28 bits for the sound signals. Having reached its final count 30, the counter 30, like the corresponding counter at the transmitting end, starts a counter 22 which provides no write pulses but starts a counter 13 upon reaching its final count 22. This counter 13 then delivers 13 write pulses ST13, thereby writing the subsequently arriving remaining 13 bits into the shift register 27. This shift register now contains 43 bits, namely 2 bits as the start pulse, 40 bits for the sound signals TSI, and the control bit STI.

For reading from the shift register 27 and for further processing, there are provided, like at the transmitting end, a counter 71 and a logic network 31 which generates the necessary clock signals. The counter 71 is again set to zero on each OR edge and is fed with a clock signal $F_{sc}$ of chrominance-subcarrier frequency which is derived from the chrominance subcarrier $f_{sc}$ in the sine-square wave converter 25.

The logic network 31 applies read pulses LT through the OR gate 29 to the clock input of the shift register 27. To prevent the first two bits, i.e., the start pulse STI, from being processed as sound signals, a counter 2 and an AND gate 32 are provided. The counter 2 is set to zero on each OH edge; on the occurrence of the first two read pulses LT, it provides a signal which is applied to the inhibiting input of an inhibit gate 32 whose other input is fed with the bits coming from the shift register via an inhibit gate 33. Thus, the inhibit gate 32 is closed to the first two bits, i.e., to the start pulse.

For separating the 43rd bit, the control bit STB, a decoder circuit D13, the inhibit gate 33, and an AND gate 34 are provided. The decoder circuit D13 decodes the count 13 of the counter 13, thereby closing the inhibit gate 33 to the 43rd bit, the control bit, which is passed by the simultaneously opened AND gate 34 and fed to a mode control 35.

In this manner, only those bits which represent sound signals reach an expander 36 which, controlled by a clock signal EXT from the logic network 31, expands each of the 10-bit words corresponding to a sample value to 14 bits again. A digital-to-analog converter 37, which is controlled by a clock signal DAT, then converts these 14-bit words into analog values which are distributed to the individual sound channels T1 ... T6 via a sound channel switch 38. The clock signal TKS for the sound channel switch 38 is also provided by the logic network 31 dependent upon the respective mode detected by the mode control 35.

The following should be mentioned:

If the receiving equipment is an add-on unit for a known color television receiver which unit extracts the sound signals from the composite video-sound signal and feeds the sound and the video information to the known receiver separately, this add-on unit will contain exactly the sound-processing facility 40 (broken outline). A standards converter which, controlled by the logic network 31, generates a standard composite video signal (F)BAS capable of being processed by the receiver presently in use is not necessary.

Figure 4:
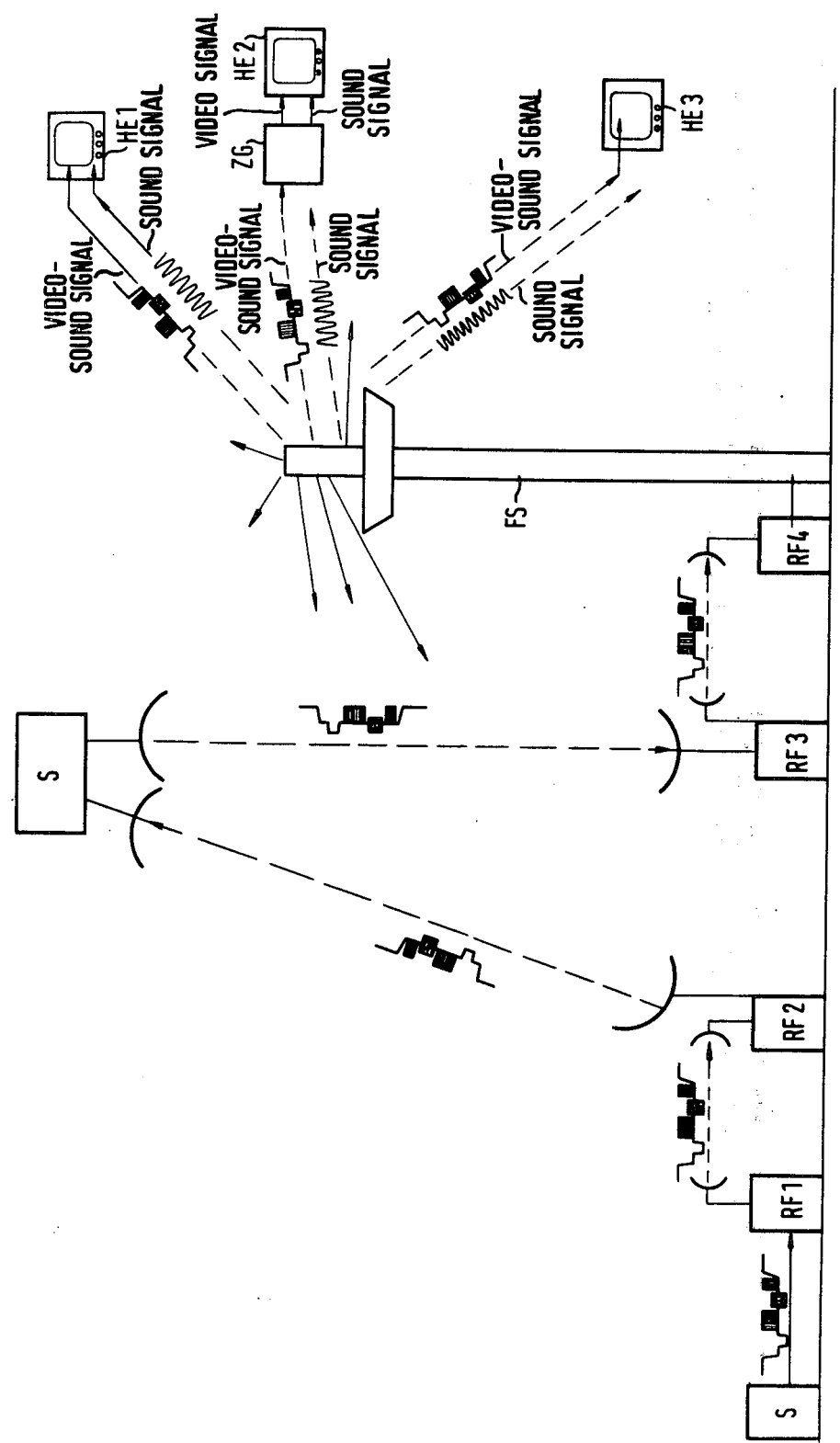
FIG. 4 shows schematically a television network using the system according to the invention.

Finally, a simplified television transmission system using the invention will be described with the aid of FIG. 4.

If bandwidth is to be saved already on the transmission path from the studio (S) to the transmitter, the sound-integrating facility shown in FIG. 2 must be used already at the studio S or else at a subsequent point of the transmission path, e.g., at the first intermediate radio station. In the example shown, a composite-sound signal is transmitted from the studio S via a cable link, a radio link RF1-RF2, a satellite S, and another radio link RF3-RF4 to the television transmitter FS supplying the domestic receivers HE. During a transition period until only new television receivers for processing the composite-video sound signal will be in use, a facility as shown in FIG. 3 is provided at the television transmitter FS. This facility extracts the sound signals from the (F)BAST signal and transmits them on a specific sound carrier, so present domestic receivers HE1 receive this sound signal and take the composite video signal (F)BAS from the composite video-sound signal (F)BAST being transmitted unchanged.

As indicated above, it is also conceivable to equip the domestic receiver HE 2 with an add-on unit ZG which contains the facility 40 shown in broken outline in FIG. 3 and selectively feeds one of the sound channels from the composite video-sound signal to the domestic receiver HE2.

A slight disadvantage is caused if the composite video-sound signal is received by the present domestic color television receivers. To avoid a color tinge during monochrome telecasts, these receivers switch off their chrominance channel when no color-sync signal (FSS) is being received during the back porch, i.e., when a monochrome signal is present according to the current standard.

As mentioned above, in the novel color television transmission system, a signal which is equal to the color-sync signal FSS transmitted during colorcasts is transmitted during monochrome telecasts, too. Since the present domestic receivers are not yet controllable by the control bits STB, it is necessary to turn the color saturation control back to the minimum when the black-and-white picture has a color tinge.

A new domestic receiver HE3 will contain the facility 40 of FIG. 3 and do without the specific sound carrier. When domestic receivers HE1 and HE2 are no longer in use, the transmission of a specific sound carrier can be dispensed with. Thus, a sliding extension of the novel television transmission system to the domestic receivers is possible.

What is claimed is:

1. A television transmission system wherein a color-sync signal and digital sound signals from at least one sound channel are transmitted in the horizontal blanking intervals during the period of the back porch, with the color-sync signal and the digital sound signals separated from each other, comprising:
    transmitting means for transmitting part of the sound signals to be transmitted during a line period before the color-sync signal, and the remainder thereafter;
    receiving means for receiving the video-sound signal so composed and extracting the sound signals therefrom.

2. A system according to claim 1, wherein the transmitting means and the receiving means include counters for reading the sound signals from, and writing them into, a buffer store which count the clock pulses for the buffer store and interrupt them for a time corresponding to the duration of the color-sync signal.

3. A system according to claim 1 wherein the receiving means are incorporated in domestic receivers.

4. A system according to claim 1 wherein the receiving means are designed as add-on units for domestic receivers.

5. A method for transmitting a color-sync signal and sound signals during the horizontal blanking interval of a video signal in a television system, comprising the steps of:
    converting the sound signals into a digital form;
    transmitting the color-sync signal during a predetermined time of the horizontal blanking interval;
    transmitting a portion of the sound signals during a period before the color-sync signal; and
    transmitting the remainder of the sound signals after the color-sync signal.

6. A method for transmitting as described in claim 5, additionally comprising the steps of:
    generating and transmitting a starting pulse immediately prior to transmission of the first portion of the sound signals; and
    generating and transmitting a control pulse after the last sound signal has been transmitted.

7. A system according to claim 5, wherein the method includes the additional steps of:
    storing the digital sound signals;
    reading a portion of the digital sound signals from storage during a predetermined portion of the horizontal blanking interval;
    interrupting the reading of digital sound signals for a time period corresponding to the duration of the color-sync signal; and
    reading the remainder of the digital sound signals from storage after the color-sync signal has been transmitted.

8. A method as described in claim 5, additionally comprising the steps of:
    receiving the transmitted signals; and
    separating the digital sound signals from the color-sync signal.

9. A method as described in claim 8, additionally comprising the steps of:
    detecting the reception of the digital sound signals;
    writing said digital sound signals into a storage means for a predetermined period of time;
    interrupting said writing for a predetermined period of time corresponding to the duration of the color-sync signal;
    writing the remainder of the digital sound signals into the storage means; and
    reading the digital sound signals from the storage means.

10. A method of transmitting a sound-in-video television signal, comprising the steps of:
    transmitting a color-sync signal during a predetermined standard time domain of a horizontal blanking interval; and
    transmitting the sound signals during the horizontal blanking interval partially before the color-sync signal and partially after the color-sync signal.

* * * * *